United States Patent
Cho et al.

(10) Patent No.: US 7,715,418 B2
(45) Date of Patent: May 11, 2010

(54) METHOD AND APPARATUS FOR GUARANTEEING QUALITY OF SERVICE IN A RESIDENTIAL ETHERNET SYSTEM

(75) Inventors: Jae-Hun Cho, Seoul (KR); Seong-Taek Hwang, Pyeongtaek-si (KR); Hoon Kim, Suwon-si (KR); Yun-Je Oh, Yongin-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 233 days.

(21) Appl. No.: 11/891,122

(22) Filed: Aug. 9, 2007

(65) Prior Publication Data
US 2008/0037567 A1    Feb. 14, 2008

(30) Foreign Application Priority Data
Aug. 11, 2006    (KR) .................. 10-2006-0076411

(51) Int. Cl.
*H04L 12/56*    (2006.01)
(52) U.S. Cl. .................................. 370/412
(58) Field of Classification Search ............... 370/395, 370/401, 412
See application file for complete search history.

(56) References Cited

U.S. PATENT DOCUMENTS

| | | | | |
|---|---|---|---|---|
| 6,167,445 A | * | 12/2000 | Gai et al. | 709/223 |
| 6,570,883 B1 | * | 5/2003 | Wong | 370/412 |
| 7,020,143 B2 | * | 3/2006 | Zdan | 370/395.21 |
| 2003/0227876 A1 | | 12/2003 | Ruutu et al. | |
| 2005/0030871 A1 | | 2/2005 | Kato et al. | |

FOREIGN PATENT DOCUMENTS

| | | |
|---|---|---|
| EP | 1 294 134 | 3/2003 |
| KR | 2006-69149 | 6/2006 |
| WO | WO 02/25988 | 3/2002 |

* cited by examiner

*Primary Examiner*—Derrick W Ferris
*Assistant Examiner*—Christopher R Crompton
(74) *Attorney, Agent, or Firm*—Cha & Reiter, LLC

(57) ABSTRACT

A method and apparatus for ensuring QoS in a synchronous Ethernet bridge are disclosed, in which a classifier classifies an ingress packet according to a PHB mapped to a DSCP value of the packet and provides the classified packet to one of a predetermined synchronous packet queue and a predetermined asynchronous packet queue, a buffer queue with a plurality of queues mapped to priority levels buffers the classified packet, a marker marks the buffered packet as a synchronous packet or, if the buffered packet is an asynchronous packet, marks the packet in a predetermined format corresponding to a priority level of the packet, and a synchronous Ethernet scheduler schedules the marked packet.

14 Claims, 8 Drawing Sheets

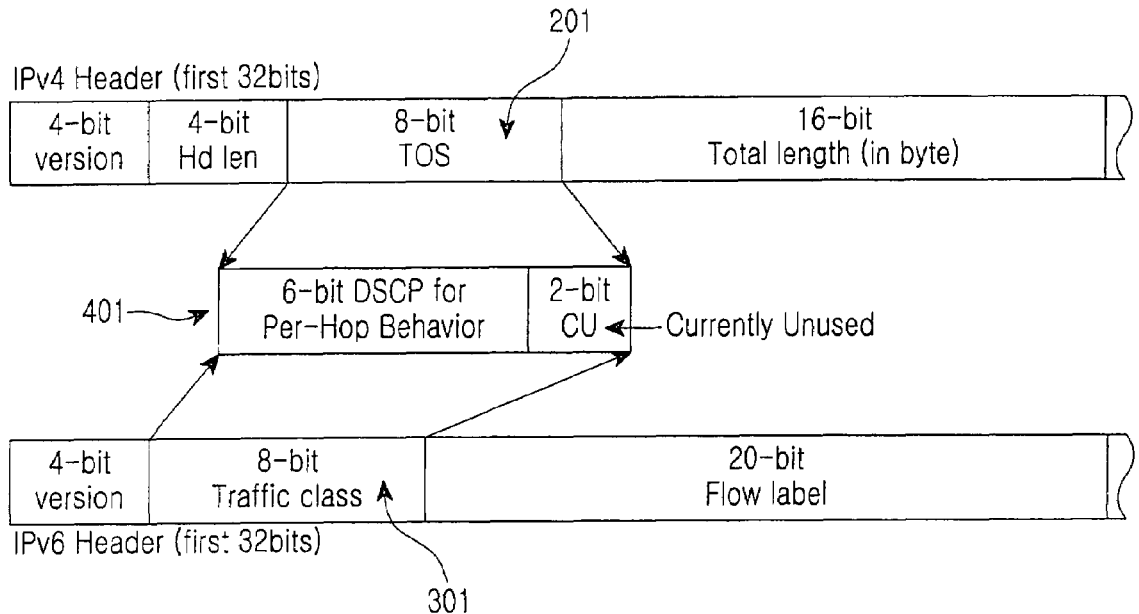

FIG.4

| PHB | Recommended DSCP Value | | | | DESCRIPTION |
|---|---|---|---|---|---|
| Default | 000000 | | | | DEFAULT SERVICE, best-effort |
| Class Selector | XXX000 | | | | SPECIFIC SERVICE, AS XXX IS HIGHER, IT REPRESENT HIGHER PRECEDENCE |
| EF(expedited forwarding) | 101110 | | | | CONTRACTED RATE-NORMAL PROCESSING, HIGHER RATE-RATE CONTROL, NON-CONTROLLED PACKET-DISCARDED VIRTUAL LEASED LINE SERVICE |
| AF(Assured Forwarding) | Drop Prob | class1 | class2 | class3 | class4 | CERTAIN RATE IS ENSURED EVEN WHEN NETWORK IS CONGESTED. FOUR CLASSES ARE DEFINED ACCORDING TO QoS ELEMENTS. THREE DROP PROBABILITIES ARE DEFINED FOR VIOLATING PACKETS |
| | Low | 001010 | 010010 | 011010 | 100010 | |
| | Medium | 001100 | 010100 | 011100 | 100100 | |
| | High | 001110 | 010110 | 011110 | 100110 | |

FIG.5

| 802.1p Priority | | Recommended DSCP Value | | | | | PHB |
|---|---|---|---|---|---|---|---|
| Priority | Traffic | | | | | | |
| 7 | Network Management | | | | | | |
| 6 | Voice/Video Controlled Load Excellent Load | Drop Prob. | Class1 | Class2 | Class3 | Class4 | AF |
| 5 | | Low | 001010 | 010010 | 011010 | 100010 | |
| 4 | | Medium | 001100 | 010100 | 011100 | 100100 | |
| 3 | | High | 001110 | 010110 | 011110 | 100110 | |
| 0 | Best Effort Traffic | 000000 | | | | | Default |
| 2 | Undefined | | | | | | |
| 1 | Background Traffic | | | | | | |

FIG.8

METHOD AND APPARATUS FOR GUARANTEEING QUALITY OF SERVICE IN A RESIDENTIAL ETHERNET SYSTEM

CLAIM OF PRIORITY

This application claims the benefit of the earlier filing date, under 35 U.S.C. §119(a), to that Korean Patent Application filed in the Korean Intellectual Property Office on Aug. 11, 2006 and assigned Serial No. 2006-76411, the entire disclosure of which is hereby incorporated by reference.

BACKGROUND OF THE INVENTION

1. Field of the Invention

The present invention generally relates to Quality of Service (QoS) in a Differentiated Service (DiffServ) network. More particularly, the present invention relates to a method and apparatus for guaranteeing QoS in a residential Ethernet system.

2. Description of the Related Art

Ethernet is one of the most widely installed technologies for data transmission between different terminals. Owing to its universality and simple structure, Ethernet extends its applications to a Local Area Network (LAN) and a Wide Area Network (WAN). Although it is known that Ethernet is not suitable for transmission of delay-sensitive multimedia data, studies have been actively conducted on a technology for transmitting multimedia data including audio and video, while ensuring compatibility with legacy Ethernet networks. The technology is called Audio/Video (AV) bridging or residential bridging, now under standardization in Institute of Electrical and Electronics Engineers (IEEE) 802.1 protocol.

Meanwhile, two Internet solutions for end-to-end QoS guarantee are attracting interest as a substitute for the existing best-effort service. One is rather simple, called Integrated Service (IntServ) which relies on a receiver-initiated signaling protocol, resource ReSerVation Protocol (RSVP). IntServ provides QoS to end hosts by reserving end-to-end resources using the RSVP, when the end hosts signal their QoS needs.

IntServ provides three service classes, best-effort service, guaranteed service, and controlled load service. For packets of the service classes, path setup and resource reservation are essential before data transmission. However, performing the resource reservation process in all routers existing on a path brings about a load large enough to significantly affect the whole system.

The other Internet QoS solution is DiffServ. Instead of reserving resources on a per-flow basis, an edge node (e.g. router) classifies data packets according to user-requested QoS levels and a core node of a network forwards the traffic differentially, to thereby provide differentiated services to users. Thus, DiffServ obviates the need for a resource reservation protocol and resource reservation and offers the benefits of small network load and provisioning of differentiated services.

Differentiated Service Code Point (DSCP) representing precedence is set in Type of Service (TOS) of the header of an Internet Protocol (IP) datagram. For DSCP, four values are defined: Default Per-Hop-Behavior (PHB), Assured Forwarding (AF) PHB, and Expedited Forwarding (EF) PHB. A core router processes a high-precedence packet first of all according to a DSCP setting. In this way, differentiated services are provided.

The edge router has five components, classifier, meter, marker, shaper, and dropper to implement differentiated traffic control. The classifier classifies received traffic based on various criteria. The meter measures the classified traffic flow and compares the measurement with a predetermined traffic profile so that the marker can mark the traffic flow appropriately. Marked packets are controlled in accordance with a predetermined bandwidth characteristic for traffic by the shaper that controls a bandwidth by delaying and the dropper that controls a bandwidth by dropping.

FIG. 1 illustrates a typical DiffServ network for QoS guarantee. Referring to FIG. 1, an edge router sets a DSCP in an IP packet and sends the IP packet to a core router 12. The core router 12 performs a PHB according to the DSCP value. While the core router 12 may have a relatively simple structure as it only has to forward the IP packet between hops, the edge router 11 has a complex configuration due to classification and conditioning.

Both IntServ and DiffServ present QoS guarantee solutions over IP version 4 (IPv4) and IP version 6 (IPv6) networks. Yet, they are confined to router-based Layer 3 (L3) networks and not effective in ensuring QoS for transmission of time-sensitive data such as Voice over Internet Protocol (VoIP) in a Layer 2 (L2)-based edge network that interfaces with L3 or higher networks. Especially in Wireless Broadband (WiBro), there is no specified method for ensuring QoS in an L2 network between a Radio Access Station (RAS) and an Access Control Router (ACR). While RSVP-based IntServ or DiffServ exists in an L3 or higher network where the ACR communicates with an external network, no QoS guarantee for L2 may cause a severe bottleneck phenomenon. As a result, jitter or latency, or even packet loss may happen.

For background details of the L2-based WiBro network, see Korea Patent Application No. 2006-60848 entitled "Bridge-Type Portable Internet System and Signal Processing Method Thereof" and filed on Jun. 30, 2006 by the present applicant (U.S. Ser. No. 11/644,575 filed on Dec. 22, 2006) or Korea Patent Application No. 2006-68828 entitled "Bridge-based Base Station backbone System and Signal Processing Method Thereof" and filed on Jul. 24, 2006 (U.S. Ser. No. 11/880,659, filed on Jul. 24, 2007) by the present applicant.

SUMMARY OF THE INVENTION

An aspect of exemplary embodiments of the present invention is to address at least the above described problems. Accordingly, an aspect of exemplary embodiments of the present invention is to provide a QoS guaranteeing method and apparatus in a residential Ethernet system, which ensures QoS in transmitting time-sensitive data in L2 using a bridge in a wireless edge network such that QoS can be continuously ensured in an L3 or a higher network, which ensures QOS through AV bridging in wired transmission, and which ensures QoS under a typical network environment in which L2 is overlaid with L3.

In accordance with an aspect of exemplary embodiments of the present invention, there is provided an apparatus for ensuring QoS in a synchronous Ethernet bridge, in which a classifier classifies an ingress packet according to a PHB mapped to a DSCP value of the packet and provides the classified packet to one of a predetermined synchronous packet queue and a predetermined asynchronous packet queue, a buffer queue with a plurality of queues mapped to priority levels buffers the classified packet, a marker marks the buffered packet as a synchronous packet or, if the buffered packet is an asynchronous packet, marks the packet in a predetermined format corresponding to a priority level of the packet, and a synchronous Ethernet scheduler schedules the marked packet.

In accordance with another aspect of exemplary embodiments of the present invention, there is provided a method for ensuring QoS in a synchronous Ethernet bridge, in which an ingress packet is classified as one of a synchronous packet and an asynchronous packet according to a PHB mapped to a DSCP value of the packet, and if the packet is classified as a synchronous packet, the packet is buffered in a predetermined highest-priority queue, marked as a synchronous packet, and scheduled.

BRIEF DESCRIPTION OF THE DRAWINGS

The above and other objects, features exemplary embodiments of the present invention will be more apparent from the following detailed description taken in conjunction with the accompanying drawings, in which:

FIG. 4 illustrates the structure of a DSCP field in a typical DiffServ model;

FIG. 5 is an exemplary table listing PHBs and recommended DSCP values in the typical DiffServ model;

FIG. 8 is a table listing priority levels according to DSCP values in the typical DiffServ model.

Throughout the drawings, the same drawing reference numerals will be understood to refer to the same elements, features and structures.

DETAILED DESCRIPTION OF THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
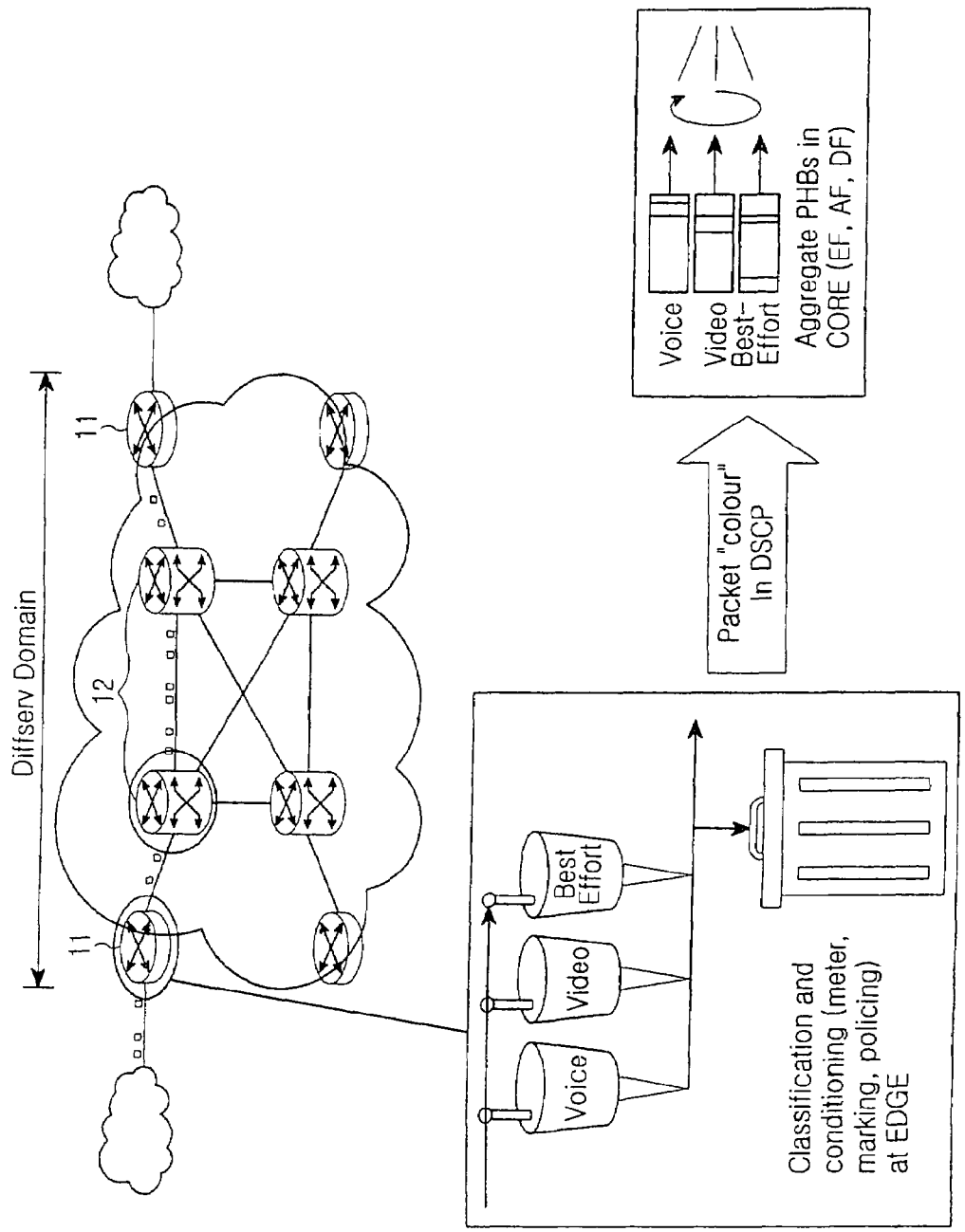
FIG. 1 illustrates a typical DiffServ network for QoS guarantee.
Figure 2:
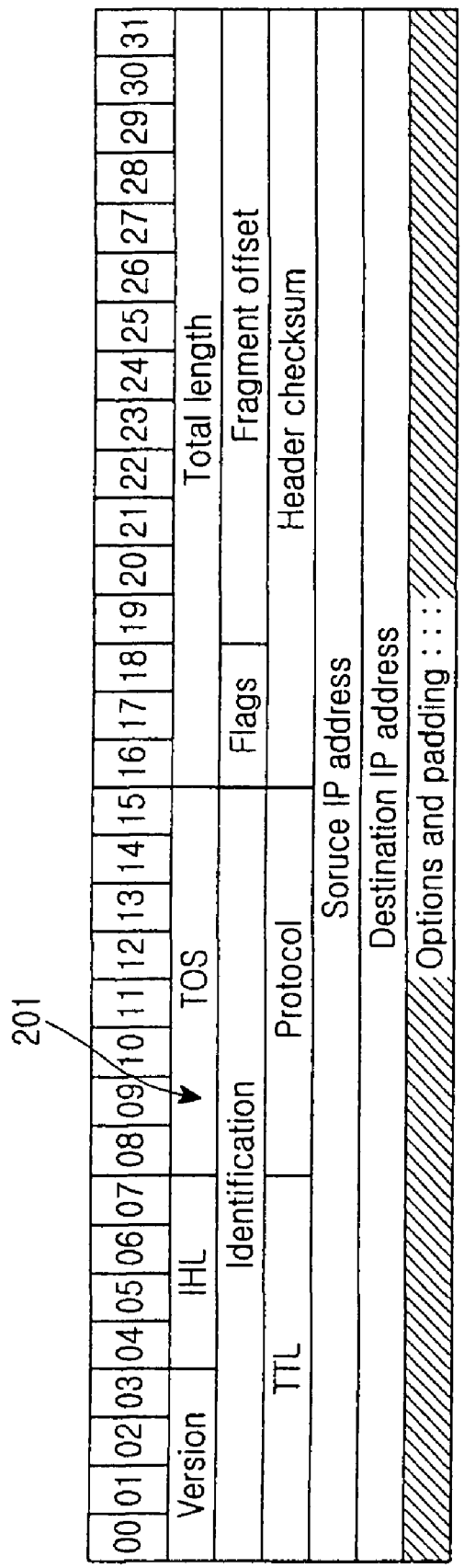
FIG. 2 illustrates the structure of a typical IPv4 packet header.

FIG. 2 illustrates the structure of a typical IPv4 packet header. Referring to FIG. 2, a ToS 201 is defined to ensure QoS in L3 in the header of an IPv4 packet. It is an 8-bit field indicating a QoS type in DiffServ. The first three bits of the ToS 201 specify IP precedence, followed by four bits indicating high reliability, high throughput, low delay and low cost, respectively, when marked. As the precedence bits are set to a higher value, they represent a higher precedence. Thus, 0 indicates the lowest precedence and 5 indicates the highest precedence, as 6 and 7 are reserved for Internet use and Network use, respectively.

Figure 3:
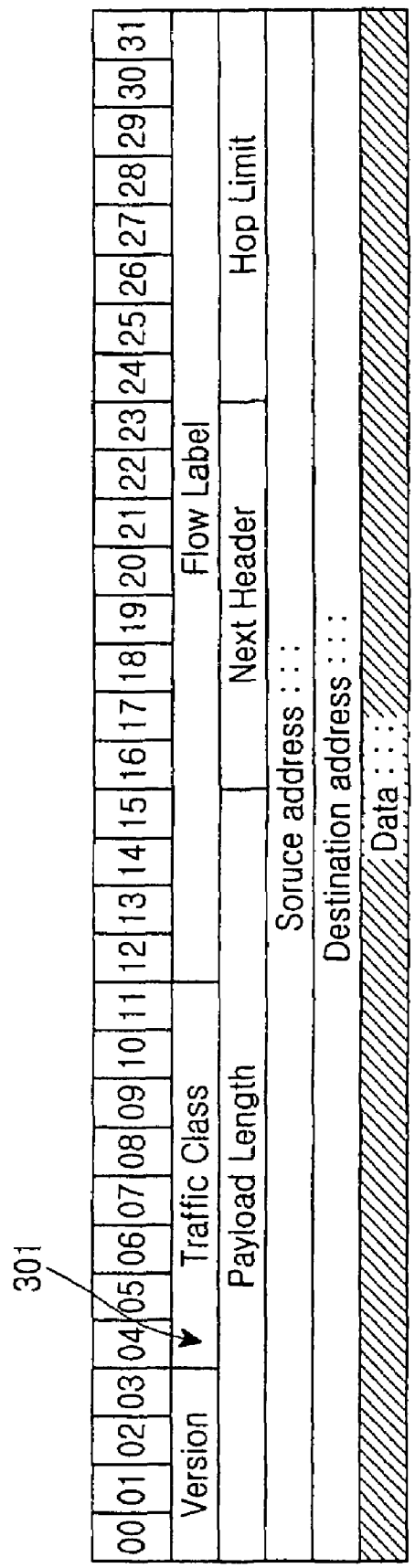
FIG. 3 illustrates the structure of a typical IPv6 packet header.

FIG. 3 illustrates the structure of a typical IPv6 packet header. Referring to FIG. 3, an 8-bit Traffic Class field 301 in the header of an IPv6 packet is functionally identical to the ToS of the IPv4 packet.

FIG. 4 illustrates the structure of a DSCP field in a typical DiffServ model. Referring to FIG. 4, a DSCP field 401 in the header of a packet replaces the ToS illustrated in FIG. 2 or the Traffic Class illustrated in FIG. 3. The DSCP 401 describes a PHB that a router has to apply to the packet. It substitutes for the precedence bits and the ToS bits without significant modification to the existing IP system and overcomes the limitation of the conventional IP precedence scheme in providing specific control to traffic flows. The first six bits of the ToS field are used for the DSCP. DSCP values with the last bit set to 1 are reserved for test use or private use and thus the DSCP can actually specify 32 standardized PHBs.

FIG. 5 is an exemplary table listing PHBs and recommended DSCP values in the typical DiffServ model. Four DSCPs are defined according to the PHBs assigned to the DSCPs. The PHBs are the default PHB, Class Selector (CS) PHBs, EF PHB, and AF PHBs. A packet marked with a DSCP value mapped to the default PHB gets the traditional best-effort service with the lowest priority. To preserve backward compatibility with the IP-precedence scheme, DSCP values of the form 'xxx000' (xxx specifies a class) are defined. These codepoints are called CS codepoints. The EF PHB provides the highest-priority class of service. The recommended DSCP value for the EF PHB is '101110' (binary). Because even a device that is not aware of DSCP values, i.e. a device that does not operate in DiffServ treats a packet with a DSCP value of 101110 as a packet with an IP precedence of 5, the EF PHB provides a virtual leased line service. The AF PHBs ensure QoS at a certain level even when congestion exists. The AF PHBs define four AF classes according to QoS levels. Within each AF class, the fourth and fifth bits of a DSCP value, except for the first three bits, representing a class specify three probability values: High, Medium, and Low.

Figures 6A, 6B:
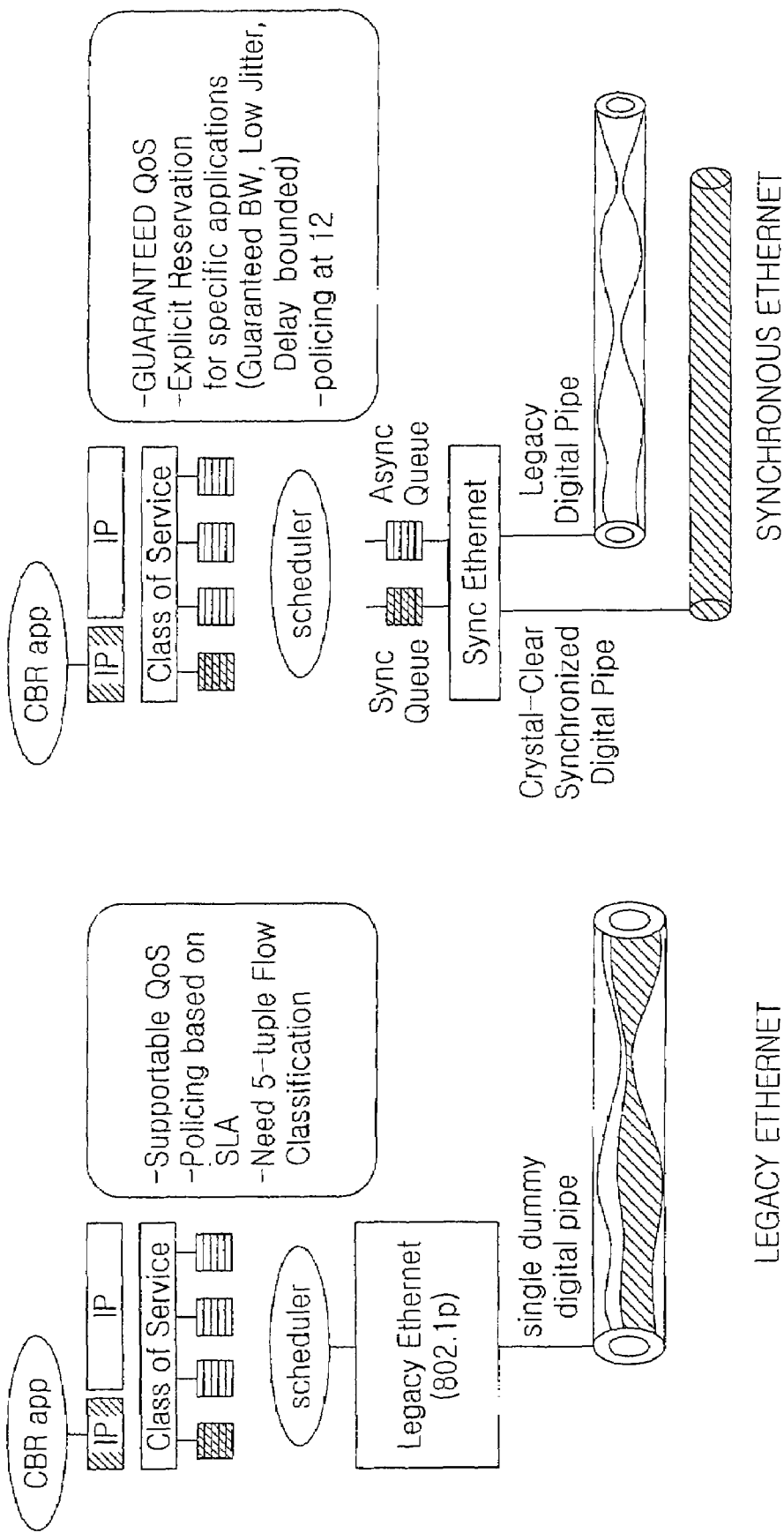
FIG. 6A illustrates a legacy Ethernet based on IEEE 802.1p/q.
FIG. 6B illustrates the concept of packet processing for QoS guarantee in a residential Ethernet system according to the present invention.

FIG. 6A illustrates a legacy Ethernet based on IEEE 802.1p/q and FIG. 6B illustrates the concept of packet processing for QoS guarantee in a residential Ethernet system according to the present invention, as compared to packet processing in the legacy Ethernet. As illustrated in FIG. 6B, the present invention introduces the AV bridging under standardization in IEEE 802.1 as to L2 in order to guarantee continuous QoS without bottleneck from L3 to L2. The AV bridging (synchronous Ethernet) classifies traffic into synchronous packets requiring low jitter variation and low latency and asynchronous packets (best-effort packets) and parses the synchronous packets into a separate queue during higher-layer classification into classes of service. Therefore, while the synchronous packets and the asynchronous packets are subject to the same effects under a traffic environment in the legacy Ethernet, the synchronous packets have a preferential treatment over the asynchronous packets and are less affected by the traffic environment, compared to the asynchronous packets in the synchronous Ethernet. Therefore, the synchronous Ethernet guarantees low packet loss and low jitter for the synchronous packets.

Figure 7:
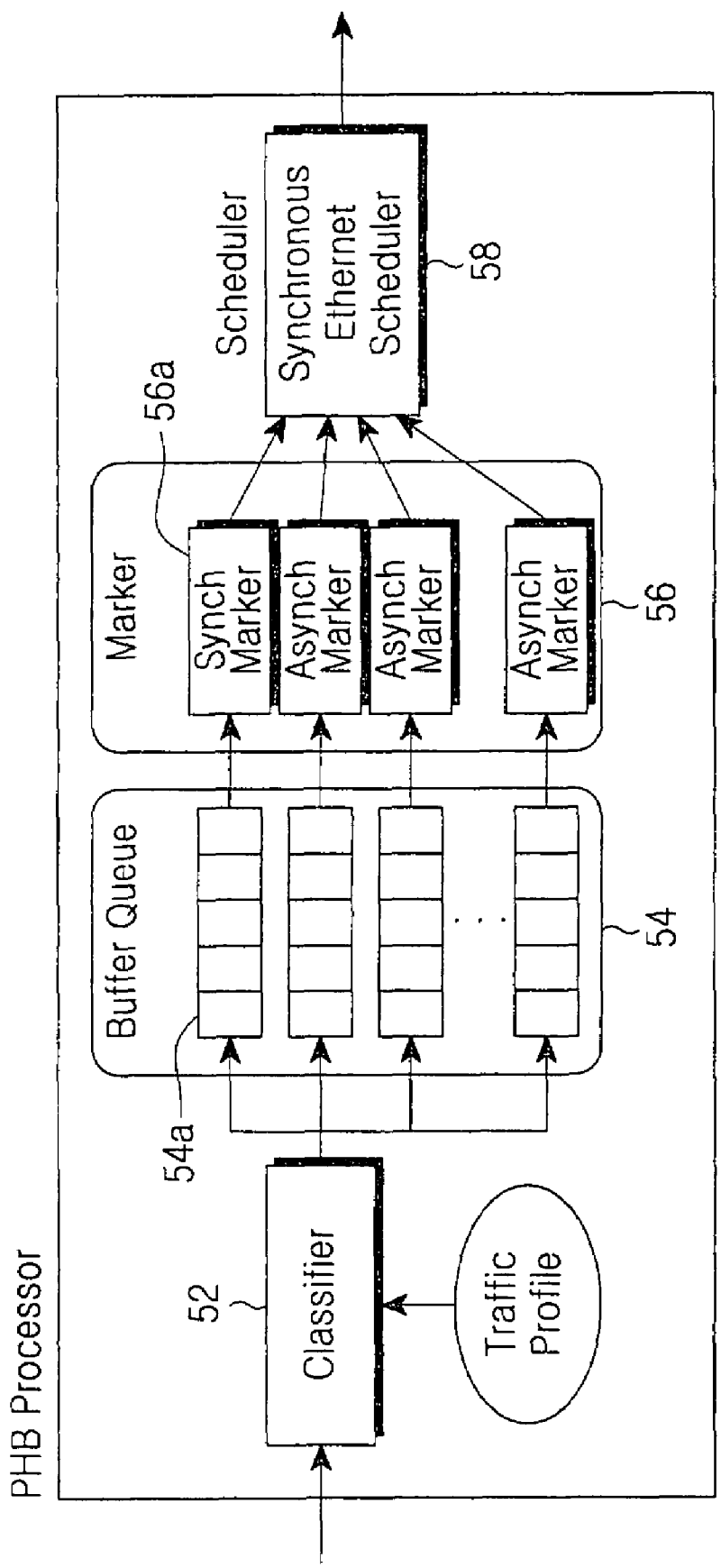
FIG. 7 is a block diagram of a PHB processor in a synchronous Ethernet bridge according to an exemplary embodiment of the present invention.

FIG. 7 is a block diagram of a PHB processor in a synchronous Ethernet bridge according to an exemplary embodiment of the present invention. The synchronous Ethernet bridge can be an edge bridge in an L2 network. It is connected to an edge router supporting DiffServ and appropriately schedules a packet received from the edge router referring to the DSCP value of the header of the packet, so that QoS can be ensured also in an L2 network.

Referring to FIG. 7, the PHB processor includes a classifier 52 for classifying an ingress packet according to the DSCP value of the packet and providing the packet to a predetermined synchronous or asynchronous packet queue, a buffer queue 54 with a plurality of queues mapped to priority levels, inclusive of a highest-priority queue 54a, a marker 56 for marking each queued packet as a synchronous packet or in a predetermined format according to its priority level when the packet is an asynchronous packet, and a synchronous Ethernet scheduler 58 for scheduling the marked packets and outputting the egress packets.

To be more specific, upon receipt of an ingress IP packet with a DSCP value of 101110, i.e. the EF PHB indicating a top priority service with a contracted rate requirement, the classifier 52 provides the packet to the highest-priority queue 54a. The marker 56 marks the packet as a synchronous packet by converting an Ether Type (Etype) in its Media Access Control (MAC) header to, for example, '0x3305'. The synchronous Ethernet scheduler 58 schedules the synchronous packet. This marking scheme is a mere exemplary application and the marking may be carried out in compliance with the standards set by IEEE 802.1as or IEEE 802.1at.

A CS PHB mapped to a DSCP value xxx000 set by a network provider or a particular application program has high precedence if xxx is high. A packet with a CS PHB representing high precedence can be marked as a synchronous packet, when needed.

Meanwhile, an asynchronous packet is processed in a similar manner. An AF PHB packet and a best-effort packet are treated as asynchronous packets. As illustrated in FIG. 8, the asynchronous packets are processed using eight priority levels that can be set in an IEEE 802.1p/q Virtual Local Area Network (VLAN) tag according to their classes or drop probabilities.

In the synchronous Ethernet bridge, packet transmission from the edge router supporting DiffServ is performed in the reverse order of the above operation. The operation of the synchronous Ethernet bridge will be described below in great detail.

Figure 9:
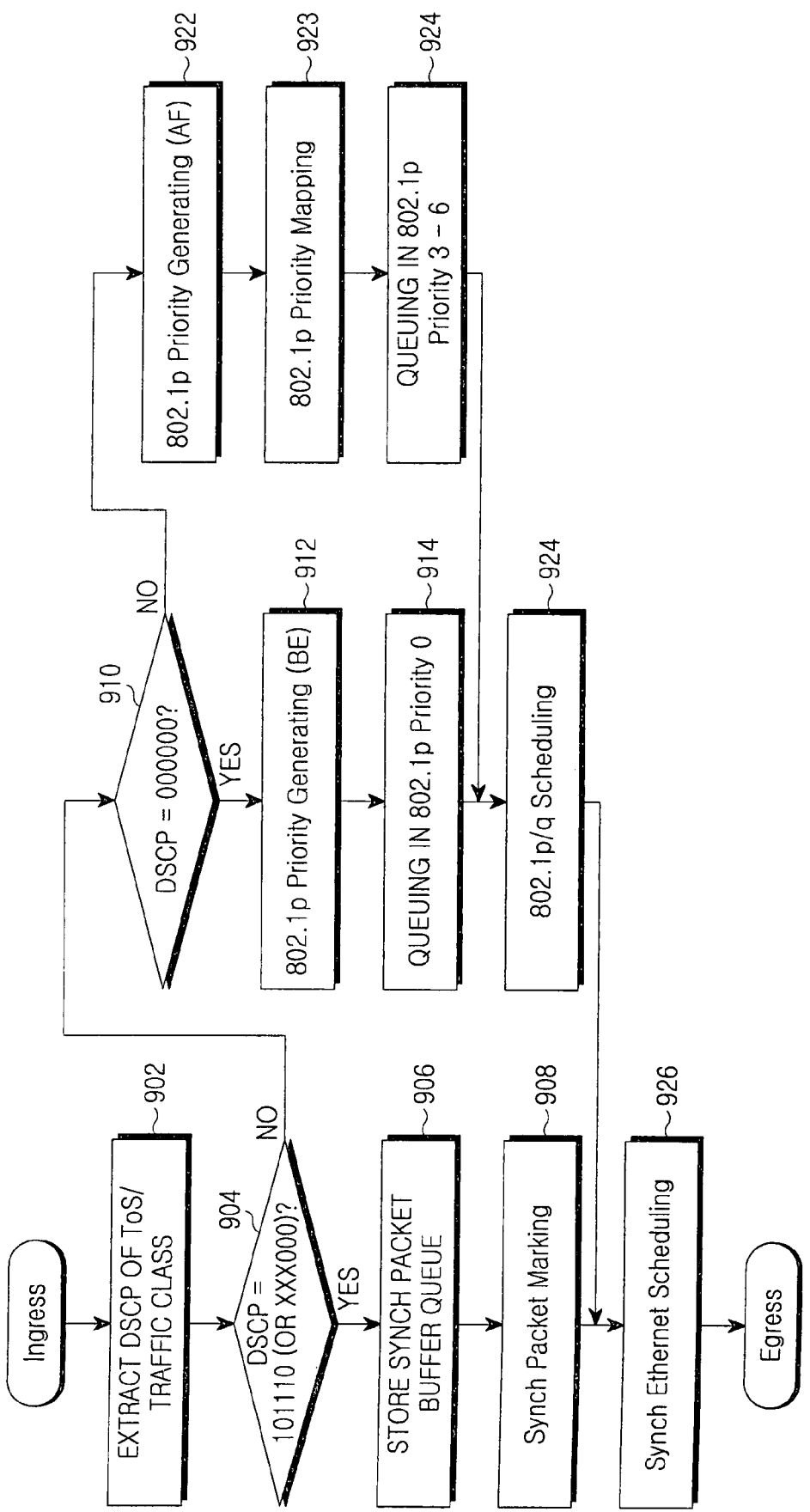
FIG. 9 is a flowchart illustrating a packet processing operation for QoS guarantee in the synchronous Ethernet bridge according to an exemplary embodiment of the present invention.

FIG. 9 is a flowchart illustrating a packet processing operation for QoS guarantee in the synchronous Ethernet bridge according to an exemplary embodiment of the present invention.

Referring to FIG. 9, upon receipt of an ingress packet, a DSCP in the ToS or Traffic Class of the IP header of the packet is extracted in step 902 and it is determined whether the DSCP value is 101110 (or whether xxx is high if the DSCP value is xxx000) in step 904. If the DSCP value is 101110, the packet is buffered in the synchronous packet queue in step 906. In step 908, the packet is marked as a synchronous packet. Then the marked packet is scheduled by synchronous Ethernet scheduling in step 926.

On the other hand, if the DSCP value is not 101110 in step 904, it is determined whether the DSCP value is 000000 in step 910. If the DSCP value is 00000, i.e. it indicates the best-effort PHB, the packet is prioritized according to IEEE 802.1p/q and thus a user priority is written in the VLAN tag of the packet in step 912. The packet is queued according to the priority level '0' of IEEE 802.1p in step 914 and scheduled based on IEEE 802.1p/q in step 924. Then the procedure goes to step 926.

Meanwhile, if the DSCP value is not 000000, i.e. it represents the AF PHB, in step 910, the packet is prioritized according to IEEE 802.1p/q and thus a user priority is written in the VLAN tag of the packet in step 922. Then, the packet is mapped to the IEEE 802.1p/q priority level according to the DSCP value as illustrated in FIG. 8 in step 923 and queued as one of the IEEE 802.1p priority levels, 3 to 6 in step 924. Then the procedure goes to step 926.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. An apparatus for ensuring Quality of Service (QoS) in a Layer 2 (L2) network in which a synchronous Ethernet bridge interfaces with the (L2) network, said apparatus comprising:
   a classifier for classifying an ingress packet according to a Per-Hop Behavior (PHB) mapped to a Differentiated Service Code Point (DSCP) value of the packet and providing the classified packet to one of a predetermined synchronous packet queue and a predetermined asynchronous packet queue;
   a buffer queue with a plurality of queues mapped to priority levels, for buffering the classified packet;
   a marker for marking the buffered packet as a synchronous packet or, if the buffered packet is an asynchronous packet, marking the packet in a predetermined format corresponding to a priority level of the packet; and
   a synchronous Ethernet scheduler for scheduling the marked packet;
   wherein the marker marks the packet as a synchronous packet by converting an Ether Type (Etype) of a Media Access Control (MAC) header in the packet.

2. The apparatus of claim 1, wherein the classifier classifies the packet as a synchronous packet, if the DSCP value indicates an Expedited Forwarding (EF) PHB.

3. The apparatus of claim 2, wherein the classifier classifies the packet as a synchronous packet, if the DSCP value indicates a Class Selector (CS) PHB with high precedence.

4. An apparatus for ensuring Quality of Service (QoS) in a synchronous Ethernet bridge, comprising:
   a classifier for classifying an ingress packet according to a Per-Hop Behavior (PHB) manned to a Differentiated Service Code Point (DSCP) value of the packet and providing the classified packet to one of a predetermined synchronous packet queue and a predetermined asynchronous packet queue;
   a buffer queue with a plurality of queues mapped to priority levels, for buffering the classified packet;
   a marker for marking the buffered packet as a synchronous packet or, if the buffered packet is an asynchronous packet, marking the packet in a predetermined format corresponding to a priority level of the packet; and
   a synchronous Ethernet scheduler for scheduling the marked packet, wherein the marker marks the packet as a synchronous packet by converting an Ether Type (Etype) of a Media Access Control (MAC) header in the packet to 0x3305.

5. A method for ensuring Quality of Service (QoS) in a Layer 2 (L2) network in which a synchronous Ethernet bridge interfaces with the (L2) network, said method comprising machine executable code provided on a non-transitory computer readable medium causing a computer system to execute the steps of:

classifying an ingress packet as one of a synchronous packet and an asynchronous packet according to a Per-Hop Behavior (PHB) mapped to a Differentiated Service Code Point (DSCP) value of the packet;

buffering the packet in a predetermined highest-priority queue when said packet is determined is classified as a synchronous packet;

marking the buffered packet as a synchronous packet; and scheduling the marked packet, wherein the buffered packet is marked as a synchronous packet by converting an Ether Type (Etype) of a Media Access Control (MAC) header in the packet.

6. The method of claim 5, wherein the classification comprises the step of: classifying the packet as a synchronous packet, if the DSCP value indicates an Expedited Forwarding (EF) PHB.

7. The method of claim 6, wherein the classification comprises the step of:

classifying the packet as an asynchronous packet, if the DSCP value indicates one of an Assured Forwarding (AF) PHB and a best-effort PHB, and processing the asynchronous packet according to eight priority levels set as an Institute of Electrical and Electronics Engineers (IEEE) 802.1p/q Virtual Local Area Network (VLAN) tag.

8. The method of claim 5, wherein the classification comprises classifying the packet as a synchronous packet, if the DSCP value indicates a Class Selector (CS) PHB with high precedence.

9. The method of claim 5, wherein the marking comprises marking the packet as a synchronous packet by converting an Ether Type (Etype) of a Media Access Control (MAC) header in the packet to 0x3305.

10. A device for ensuring Quality of Service (QoS) in a Layer 2 (L2) network in which in a synchronous Ethernet bridge interfaces with the (L2) network, said device comprising:

a processor in communication with a non-transitory memory, the processor executing code stored in said memory for classifying an ingress packet as one of a synchronous packet and an asynchronous packet according to a Per-Hop Behavior (PHB) mapped to a Differentiated Service Code Point (DSCP) value of the packet;

buffering the packet in a predetermined highest-priority queue, with in said memory, when said packet is determined is classified as a synchronous packet;

marking the buffered packet as a synchronous packet; and scheduling the marked packet, wherein the marker marks the packet as a synchronous packet by converting an Ether Type (Etype) of a Media Access Control (MAC) header in the packet.

11. The device of claim 10, wherein the classification comprises the step of: classifying the packet as a synchronous packet, if the DSCP value indicates an Expedited Forwarding (EF) PHB.

12. The device of claim 11, wherein the classification comprises the step of:

classifying the packet as an asynchronous packet, if the DSCP value indicates one of an Assured Forwarding (AF) PHB and a best-effort PHB, and processing the asynchronous packet according to eight priority levels set as an IEEE) 802.1p/q Virtual Local Area Network (VLAN) tag.

13. The device of claim 10, wherein the classification comprises classifying the packet as a synchronous packet, if the DSCP value indicates a Class Selector (CS) PHB with high precedence.

14. A device for ensuring Quality of Service (QoS) in a synchronous Ethernet bridge, comprising:

a processor in communication with a non-transitory memory, the processor executing code stored in said memory for classifying an ingress packet as one of a synchronous packet and an asynchronous packet according to a Per-Hop Behavior (PHB) mapped to a Differentiated Service Code Point (DSCP) value of the packet;

buffering the packet in a predetermined highest-priority queue, with in said memory, when said packet is determined is classified as a synchronous packet;

marking the buffered packet as a synchronous packet; and scheduling the marked packet, wherein the marking comprises marking the packet as a synchronous packet by converting an Ether Type (Etype) of a Media Access Control (MAC) header in the packet to 0x3305.

\* \* \* \* \*